Aug. 30, 1938.   J. FOLK   2,128,407

SLICING MACHINE

Filed Feb. 20, 1935   6 Sheets-Sheet 1

INVENTOR:
JOSEPH FOLK
BY Cox & Moore ATT'YS.

Aug. 30, 1938.　　　　J. FOLK　　　　2,128,407
SLICING MACHINE
Filed Feb. 20, 1935　　　6 Sheets-Sheet 2

INVENTOR:
JOSEPH FOLK
BY Cox & Moore
ATT'YS.

Aug. 30, 1938.     J. FOLK     2,128,407
SLICING MACHINE
Filed Feb. 20, 1935     6 Sheets-Sheet 3

INVENTOR:
JOSEPH FOLK
BY Cox & Moore ATT'YS.

Aug. 30, 1938.  J. FOLK  2,128,407
SLICING MACHINE
Filed Feb. 20, 1935  6 Sheets-Sheet 4
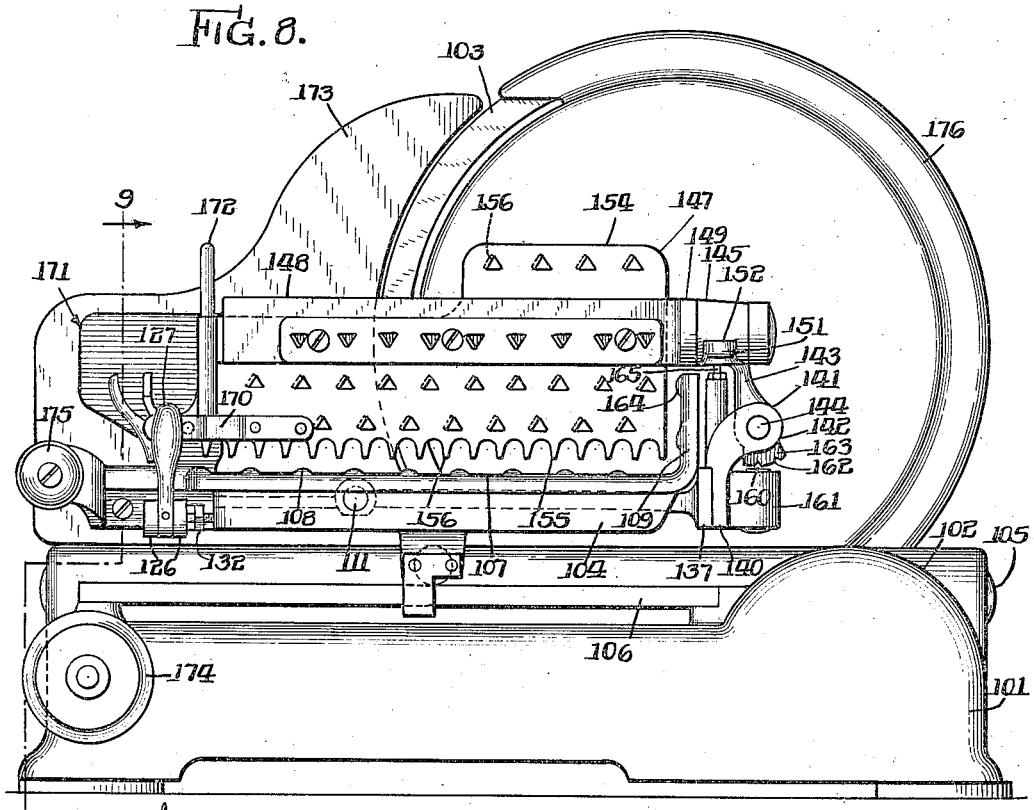
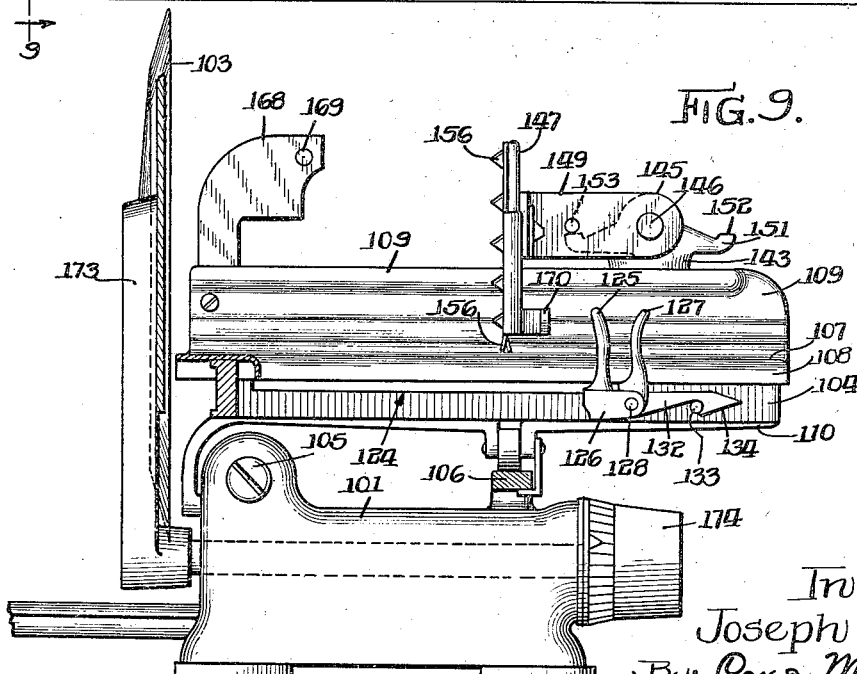
Inventor:
Joseph Folk
By: Cox & Moore attys Aug. 30, 1938.    J. FOLK    2,128,407
SLICING MACHINE
Filed Feb. 20, 1935    6 Sheets-Sheet 5
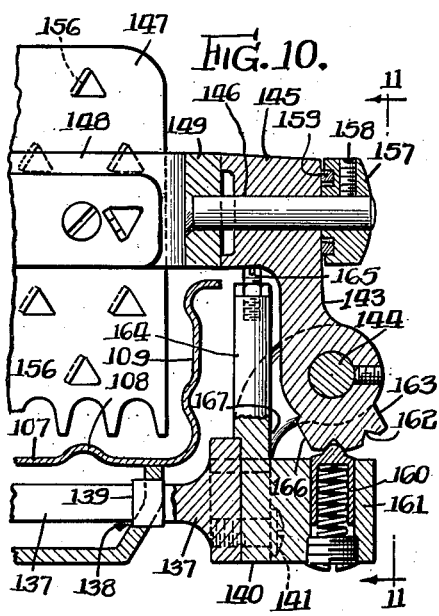
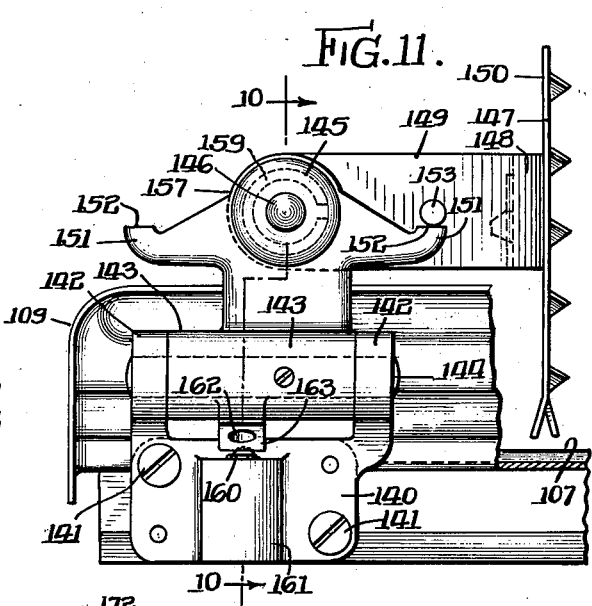
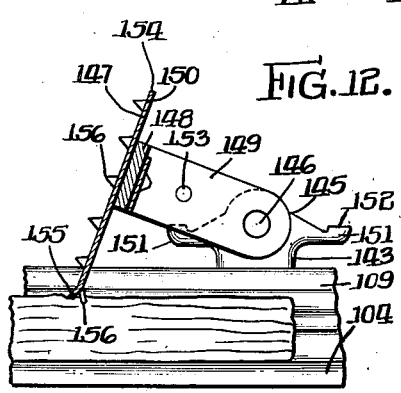
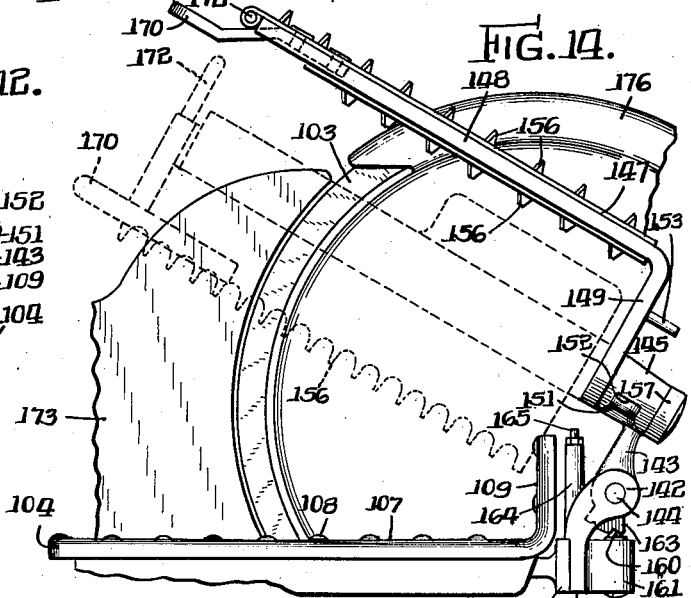
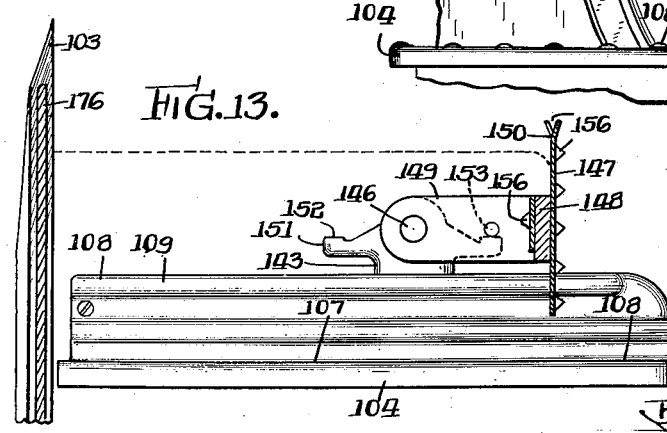
Inventor:
Joseph Folk
By: Cox & Moore attys

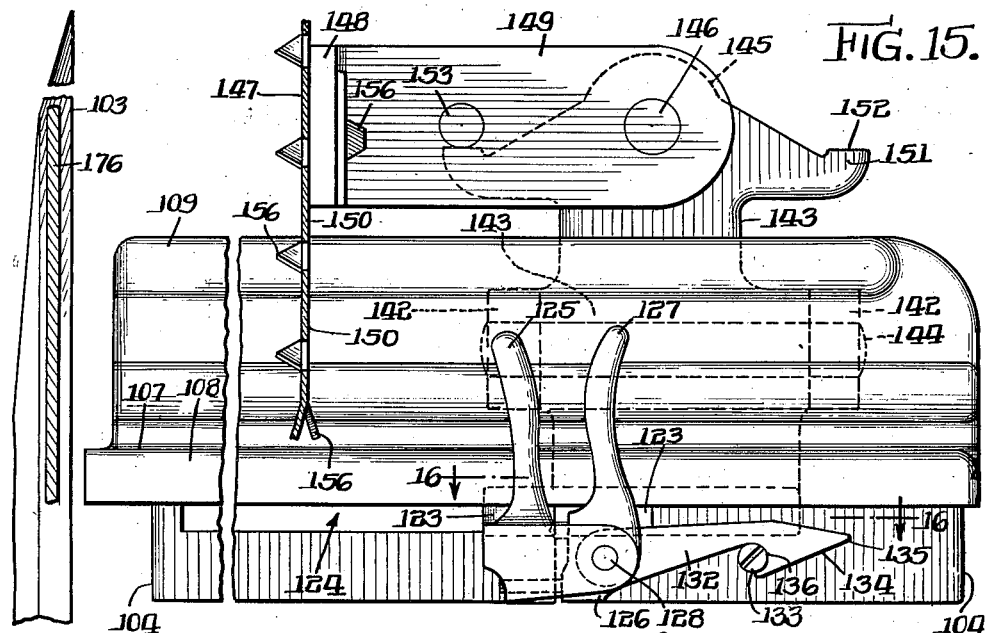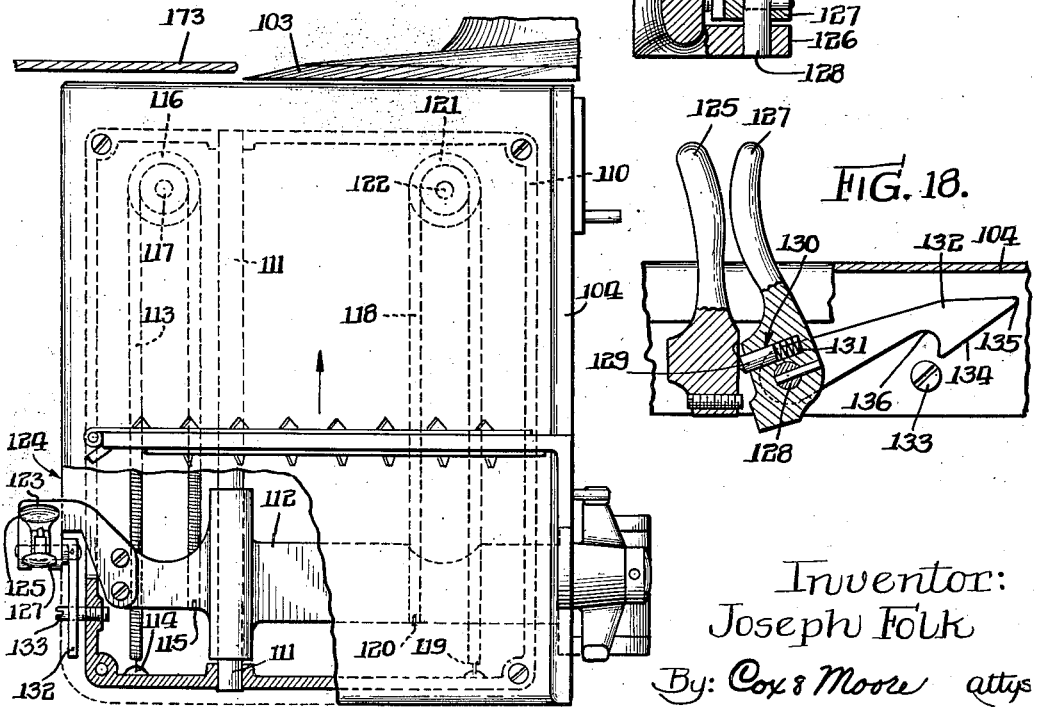

Patented Aug. 30, 1938

2,128,407

UNITED STATES PATENT OFFICE 2,128,407

SLICING MACHINE

Joseph Folk, La Porte, Ind., assignor to U. S. Slicing Machine Company, La Porte, Ind., a corporation of Indiana Application February 20, 1935, Serial No. 7,325

14 Claims. (Cl. 146—102)

This invention relates to slicing machines in which substance to be sliced is fed along a substance support by a pusher plate which engages the substance and feeds it toward the cutting plane of the knife.

This application is a continuation in part of applicant's copending application Serial No. 685,513, filed August 17, 1933, and which became Patent 2,068,980 on January 26, 1937, both assigned to the present assignee.

The principal object of the invention is to provide a slicing machine which has a new and novel adjustable pusher plate which is capable of feeding long substances as well as short substances.

Another object is to provide a pusher plate for the substance support and which is positively guided along the support, being capable of occupying, with respect to its guiding means, a plurality of positions at different distances from the cutting plane of the knife, whereby substances of greater lengths than the travel of the guiding means may be fed toward the cutting plane of the knife by the pusher plate.

A further object of the invention is to provide means for preventing movement of the pusher plate into or past the cutting plane of the knife in any of its positions whereby contact with the cutting edge of the knife is prevented, the pusher plate being capable of being moved practically all the way to the cutting plane of the knife in any of its positions.

A still further object of the invention is to provide a novel yielding means for urging the pusher plate toward the cutting plane of the knife, the said yielding means being capable of exerting a more uniform pressure on the pusher plate throughout its entire movement than with previously devised devices used in connection with pusher plates.

Still another object of the invention is to provide a pusher plate which is movable about an axis parallel to the cutting plane of the knife, whereby the pusher plate can be turned approximately 180° on its pivot making opposite faces of the pusher plate capable of engaging the substance, whereby both long and short substances may be conveniently and easily fed, which is provided with new and novel means comprising a coiled spring for resiliently urging the pusher plate in a predetermined position, and which is so constructed and arranged as to permit the upper and lower edges of the pusher plate to be used in feeding substance toward the cutting plane of the knife.

An important object of the invention is to provide a food pusher movable about an axis parallel to the cutting plane of the knife whereby the food pusher is adapted to have either of its flat faces brought into engagement with the food or substance whereby substances of various lengths can be accommodated and engaged and pushed toward the cutting plane of the knife, which is provided with means along its upper and lower edges whereby the upper and lower edges of the food pusher can be brought into engagement with the substance for moving the substance toward the cutting plane of the knife; which is provided with means for limiting the movement of the food pusher about its axis; and which is provided with means for preventing the pusher from being urged against the knife at the end of its travel and toward the knife.

Another object of the invention is to provide a spring-urged food pusher having new and improved means connected to an operating part thereof to move the pusher, and which is provided with manually controlled locking means for locking the pusher at the end of its travel away from the knife against the urging action of the spring.

A further object of the invention is to provide a spring-pressed substance or food pusher which is revolubly mounted about a pivot bearing, which is parallel to the cutting plane of the knife, and which is also operable about an axis which is perpendicular to the cutting plane of the knife.

A still further object of the invention is to provide new and improved means for manually shifting the food pusher, which is provided with means for locking the pusher in a predetermined position, and which is provided with friction means for maintaining the food pusher in any one of a plurality of positions about either of its axes.

Numerous other objects and advantages will be apparent throughout the progress of the following specification.

The accompanying drawings illustrate a selected embodiment of the invention and the views therein are as follows:

Fig. 8 is a detail side elevation looking from the right-hand side of the machine toward the left.

Fig. 9 is a detail sectional view on the line 9—9 of Fig. 8.

Fig. 10 is a detail sectional view showing the food pusher supporting an operating mechanism and taken on the line 10—10 of Fig. 11.

Fig. 11 is a detail end elevational view, partly in section, looking from the forward end of the machine toward the operator's position and looking in the direction of the line 11—11 of Fig. 10.

Fig. 12 is a detail view showing the pusher arranged in one of its many positions and engaging the substance.

Fig. 13 is a similar view showing the manner in which the pusher may be employed in connection with substances of great length.

Fig. 14 is a detail end elevation looking from the right-hand side of the machine toward the left and showing certain positions the food pusher may attain or assume when moved on its axis perpendicular to the cutting plane of the machine.

Fig. 15 is a detail elevational view, partly in section, showing the mechanism for manually moving the food pusher, said parts being shown in locked position.

Fig. 16 is a detail plan section on the line 16—16 of Fig. 15.

Fig. 17 is a detail top plan view, partly in section, showing some of the mechanism.

Fig. 18 is a detail elevational view, partly in section, showing the mechanism for manually controlling the position of the food pusher, said mechanism being at the extreme right-hand side of the machine and in unlocked position.

Figure 1:
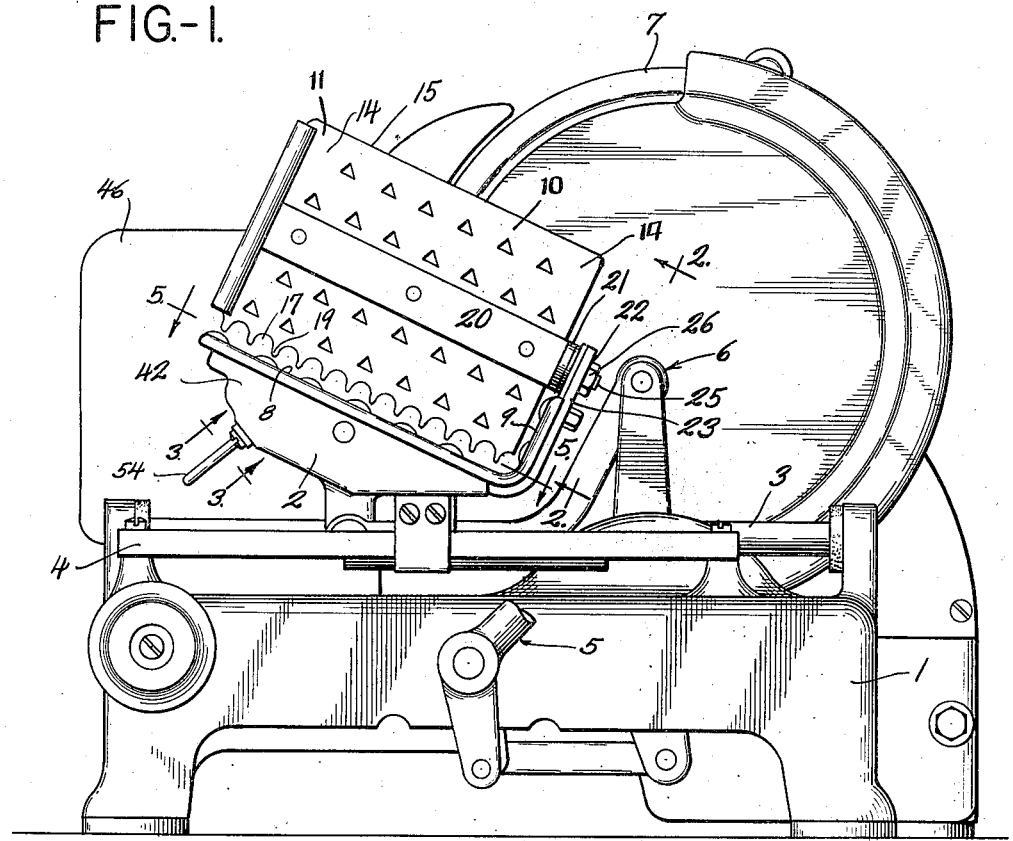
Fig. 1 is a side elevational view of a slicing machine embodying the invention, parts being broken away for the sake of clearness.

The slicing machine herein shown in Figs. 1 to 7, for the purpose of illustration, while it may be of any of the well-known types, is herein specifically shown as being provided with manually operating means for imparting rotation of the knife during the slicing operation and also moving the substance support relative to the knife simultaneously with the action of the knife as set forth in the aforesaid copending application.

The slicing machine is provided with a base 1 upon which there is mounted for fore-and-aft reciprocation a carriage 2, there being guides 3 and 4 for the carriage 2. Means, designated generally by the numerals 5 and 6, are provided for reciprocating the carriage along the base. Said means are shown and claimed in applicant's aforesaid copending application, therefore no further description thereof need be made as the mode of operating the carriage and the slicing knife 7 forms no part of the present invention.

The carriage 2 is provided with a food or substance supporting surface 8 and an apron 9 which forms an abutment. The carriage may be either the V-type carriage shown in Fig. 1 or the flat type carriage shown in Fig. 4. Substance (s) is adapted to be fed along the substance or food supporting plate 8 by means of a food or substance pusher 10.

The food or pusher 10 comprises a plate 11 having food engaging prongs 12 thereon and these prongs may be punched or struck from the plate extending from the opposite faces 13 and 14 of the plate. The upper and lower edges 15 and 16 may also be provided with prongs 17 and 18 respectively for engagement with the substance (s) to feed the substance along the food support 8 and transversely to the cutting plane of the knife and movement of the carriage. A connecting angle bar 19 has one leg 20 thereof fixed to the plate 11 and its other leg 21 pivotally connected at 22 to an upstanding leg on a bracket 23 which is fixed to a slidable bearing 24. The pivotal connection 22 comprises a pin 25 on the leg 21 which engages a receiving bearing 26 near the upper end of the bracket 23. If desired, the outer end of the pin may be threaded to receive a nut 27 for holding the parts in assembled position, Fig. 6.

Figure 5:
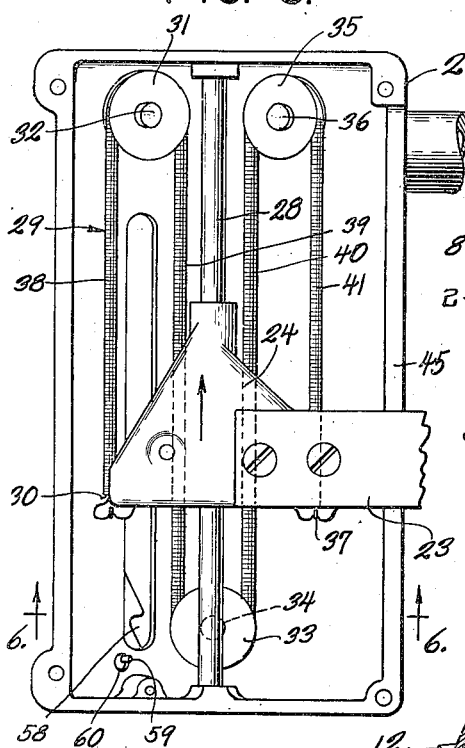
Fig. 5 is a detail sectional view taken substantially along the line 5—5 of Fig. 1 with the top plate removed.

The slide bearing 24 is slidably mounted on a rod 28 fixed to the carriage below the substance supporting plate 8. Movement of the slide bearing 24 on the rod 28 causes corresponding movement of the pusher plate 10. In Fig. 5 the substance supporting plate 8 has been removed to show mechanism for urging the pusher plate and includes the bearing 24 which is slidably mounted on the guide rod 28. The guide rod 28 is secured at its ends within suitable bearings fixed to a part of the carriage frame.

A relatively long coiled spring 29 has one free end 30 fixed to the slide bearing 24 as clearly shown in Fig. 5. The spring extends in a longitudinal direction and passes over a pulley 31 which is pivoted to the carriage frame as indicated at 32. The spring then returns and passes about a pulley 33 which is pivoted to the frame as indicated at 34. The spring then extends again in the first direction and passes about a pulley 35 pivoted to the frame as indicated at 36. The spring then returns parallel to the other reaches thereof and its other free end is connected to the slide bearing as indicated at 37. There are, therefore, four reaches 38, 39, 40 and 41 of the spring which resiliently urge the slide bearing 24 in the direction of the arrow shown in Fig. 5. The carriage 2 is completely covered, the substance supporting plate 8 covering the top and an angular plate 42 enclosing the bottom. A slot 43 is provided through which the arm 23 extends, said slot being formed by the edge 44 of the food table 8 and the edge 45, Fig. 6, of the casing or housing which also provides a guide for the bearing 24, preventing it from inadvertently shifting laterally about the guide rod 28. The resilient spring means therefore causes the bearing 24 to be constantly urged toward the cutting plane of the knife to feed the substance (s) against a gauge plate 46. Inasmuch as the food pusher 10 is operatively connected to the slide bearing 24, the food pusher is constantly urged toward the cutting plane of the knife and the gauge plate. It may, therefore, be said that the spring mechanism urges the gauge plate in a predetermined direction toward the cutting plane of the knife and the gauge plate 46 for feeding the substance to proper cutting position. The gauge plate 46 is preferably of the type shown and disclosed in applicant's copending applications Serial No. 637,246, filed October 11, 1932, which became Patent 2,004,603 on June 11, 1935 and Serial No. 464,823, filed June 30, 1930 which became Patent 2,004,601 on June 11, 1935.

Figures 2, 3:
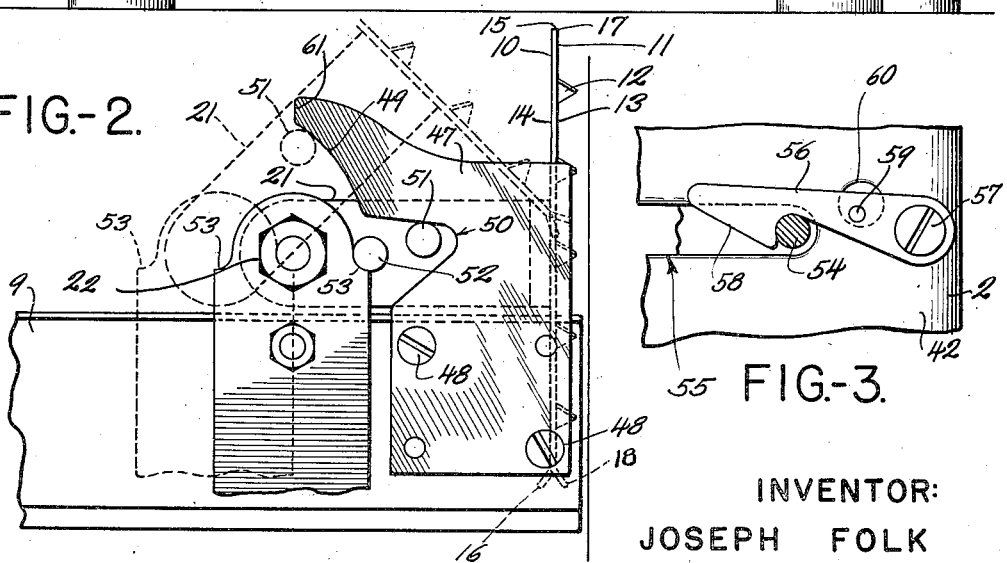
Fig. 2 is a detail sectional view on the line 2—2 of Fig. 1.
Fig. 3 is a detail sectional view on the line 3—3 of Fig. 1.
Figure 4:
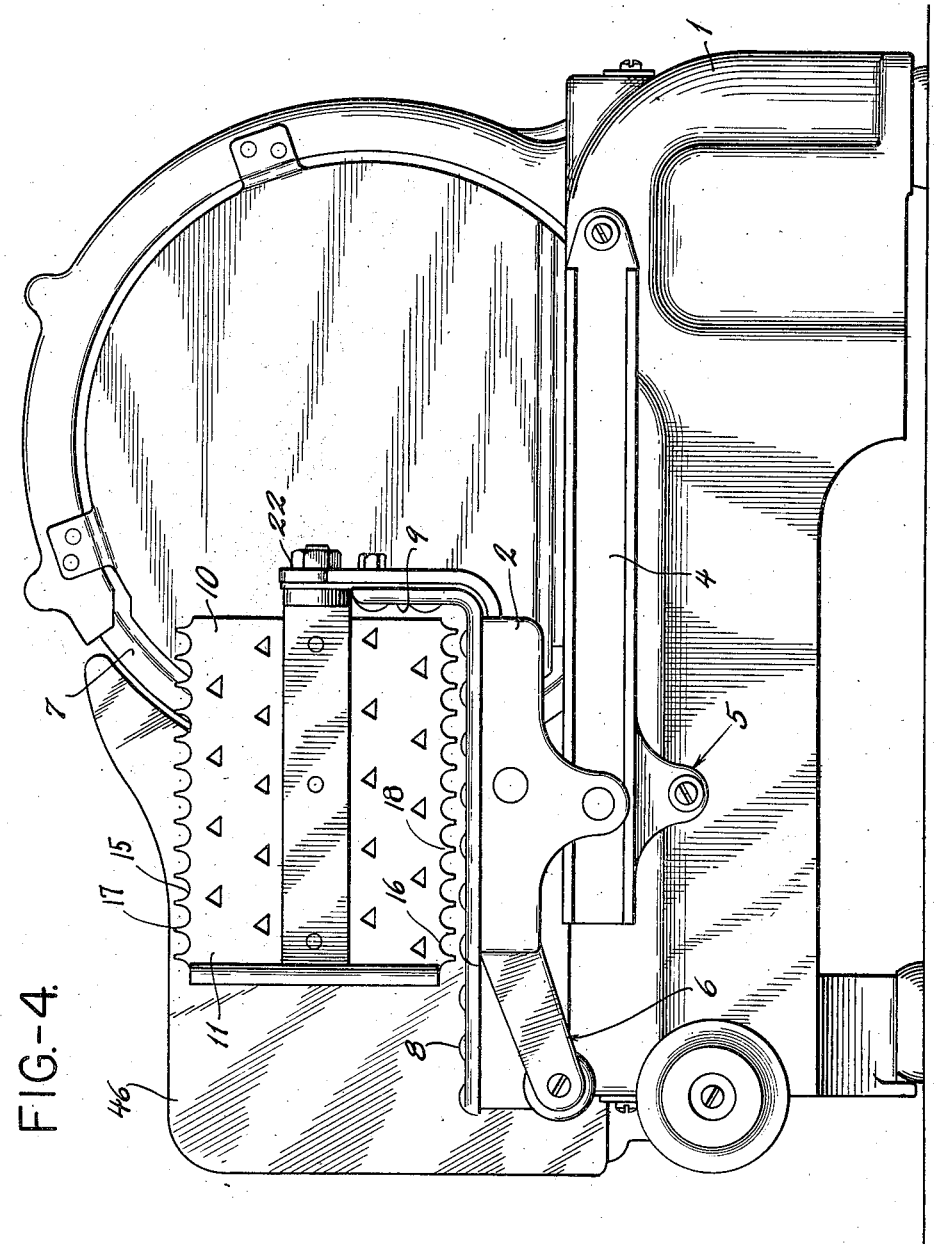
Fig. 4 is a detail side elevational view of the slicing machine provided with a flat substance supporting carriage and looking from the right toward the left.
Figure 6:
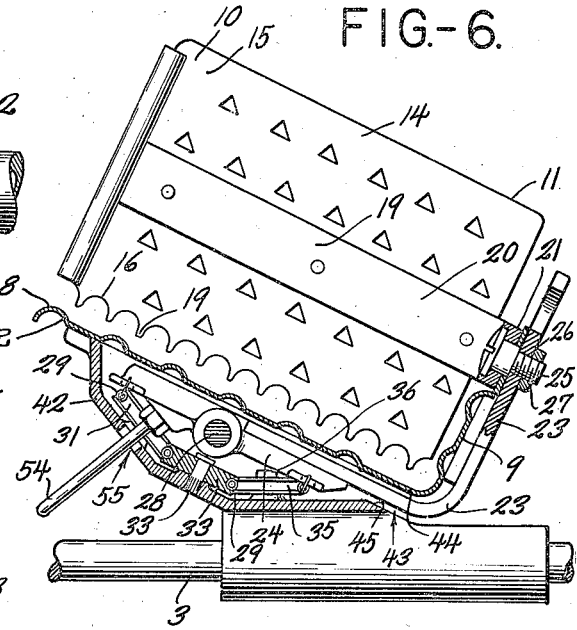
Fig. 6 is a detail vertical cross section taken through the substance supporting table substantially along the line 6—6 of Fig. 5, but with the pusher plate and substance supporting plate of the carriage shown therein.
Figure 7:
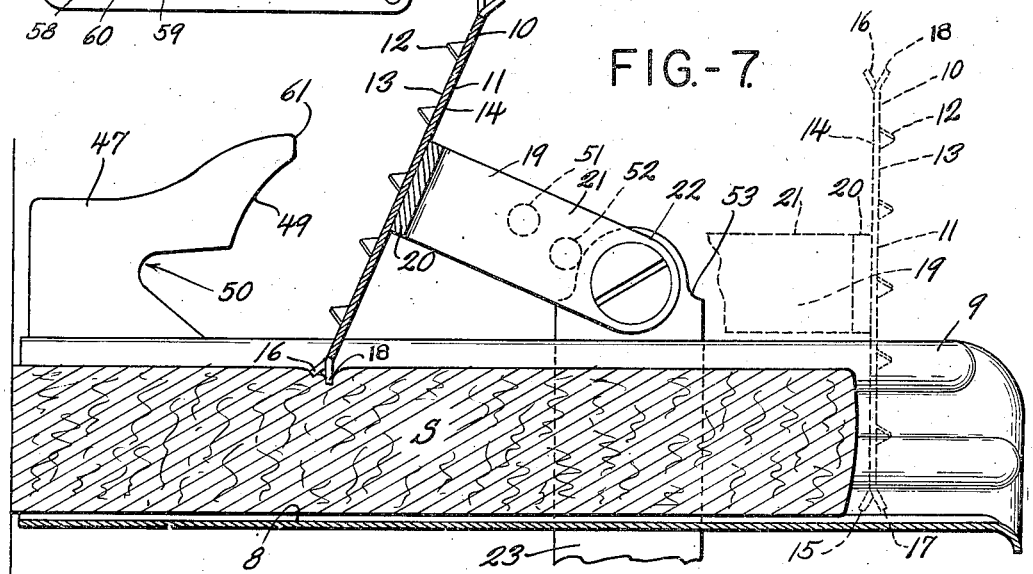
Fig. 7 is a detail view showing the manner in which the pusher plate is used to feed the substance along the substance supporting table.

When feeding a relatively thin substance, such as a slab of bacon, the pusher plate may be used in the manner illustrated in Fig. 7 by bringing the same into engagement with the upper side of the slab of bacon or other substance. The feeding movement of the slidable bearing 24 will then cause forward movement of the substance toward the cutting plane of the knife and against the gauge plate 46 in a manner which is well understood in the art to which this invention pertains. With the pusher plate 10 tilted in the position shown in Fig. 7, the prongs, at the ends of the plate, will extend a greater distance toward the cutting plane of the knife than they would if the plate were in a straight position such as shown in Figs. 1, 2 and 6, considering that the bearing 24 is in the same position with respect to the cutting plane of the knife. If the movement of the slidable member 24 were sufficient to bring the pusher plate 10 to the full line position shown in Fig. 2 with the prongs very close to the cutting plane of the knife, a pivotal movement of the plate would cause the said prongs to move past the cutting plane of the knife which is not desired inasmuch as the reciprocating movement of the table would then cause the plate to strike and foul the knife. Means are therefore provided for preventing at all times movement of any part of the pusher plate past or even into the cutting plane of the knife. Therefore in all positions of the pusher plate, the same will lie to the side of the cutting plane on which the substance support is arranged. This means is best illustrated in Figs. 2 and 7 and comprises a cam member 47 secured by means of screws 48 to the upwardly extending side of the apron 9. The cam member 47 has a curved cam surface 49 and a notch 50, the upper edge of the slot is somewhat inclined while its lower edge materially inclines in a downward direction, as clearly shown in Figure 2. Since this latter edge, however, does not have any function, its shape is not material and it is only necessary that it provide sufficient clearance for the other parts of the mechanism. The arm 21 of the angle member 19 carries a pin 51 so that if the pusher plate is in either the dotted or full line position shown in Fig. 2, the pin 51 will strike the same surface 49 to stop the forward movement of the slidable bearing 24 and of the pusher plate at a point in the path of travel of the slidable bearing such that the prongs on the pusher plate will still be in a position to clear the cutting plane of the knife. Therefore, the cam 49 automatically takes care of the movement of the slidable bearing when the pusher plate has been tilted from vertical position. In case the pusher plate is in a vertical position or substantially in a vertical position, the pin 51 is permitted to enter the notch 50 and have its full permitted amount of forward movement. Alternatively the pin 51 may engage the bottom of the slot to limit the forward movement of the pusher plate and the slidable bearing. Of course, when the pusher plate is in the dotted line position shown in Fig. 7, the plate cannot have a sufficient amount of movement toward the cutting plane of the knife to cause any damage even if the pusher plate is tilted at an angle to the dotted line position in Fig. 7.

A pin 52 mounted on the same side of the arm as the pin 51, is adapted to strike either of the shoulders 53, Fig. 7, to limit the pivotal movement of the pusher plate about its pivot 22.

The pusher plate 10 being pivoted at 22 is free to be swivelled substantially 180°, permitting the face 13 to engage relatively short pieces of the substance to push the same toward the cutting plane, or permitting its face 14 to engage the end of longer pieces of the substance. This latter construction is shown in dotted lines in Fig. 7. The food pusher is also adapted to have its edges 15 and 16 engage the substance in the manner shown in Fig. 7 to urge the substance toward the cutting plane. Regardless, however, of the position of the substance pusher on its pivot 22, the pusher plate or any part thereof is always prevented from coming into contact with or fouling the knife 7.

The spring mechanism for urging the pusher plate toward the cutting plane of the knife causes the spring pressure to be equally distributed. The spring 29 is placed under initial tension and is relatively long, passing over the pulleys 31, 33 and 35. Therefore, the amount of stretch in the spring per unit of length is less than a single spring which might be used to feed the slidable bearing 24 forwardly in the manner as set forth in the copending application Serial No. 633,594, filed September 17, 1932.

In the present construction the stretch of a unit length of spring is materially decreased and the pressure with which the bearing member is urged toward the cutting plane does not decrease materially as the slidable bearing member approaches the cutting plane of the knife as is the case where a short spring is used. Therefore, the present invention provides for a more uniform feeding of the pusher plate and consequently of the substance.

In order that the pusher plate 10 may be held in its retracted position to facilitate the placing of a substance on the carriage, an operating handle 54 is secured to the slidable bearing 24 as clearly indicated in Fig. 6. This handle or lever 54 extends through a slot 55 provided in the base closure 42, Fig. 6, and projects toward the operator's position. By grasping this handle 54 the carriage may be retracted and when fully retracted, become engaged with a latch 56 which is pivoted at 57, Fig. 3, to the base of the carriage. The latch member 56 hooks over the handle 54 and holds the slidable bearing 24 in retracted position. The latch member 56 is provided with a forward cam face 58 which engages the handle 54 during the retracted movement thereof and raises the latch until the handle reaches the position shown in Fig. 3 after which it drops down into the position indicated in that figure. A pin 59 extends laterally from the latch 56 into an opening 60 in the carriage base and this limits the swinging movement of the latch 56 so that it will not drop downwardly too far when the bearing member is in a position such that the handle 54 does not engage the latch. Thus, the cam surface 58 on the latch 56 is in a position to engage the handle 54 when the bearing is retracted. Other latch means, of course, may be provided for this purpose, but the one herein shown is very simple and its operation may be quickly done by manual pressure applied to the latch to bring the latch to inoperative position when it is again desirable to have the spring 29 urge the pusher plate toward the cutting plane of the knife.

In operation, the operator, when desiring to slice a long substance, places the substance on the food table 8 in which position the rear end of the substance cannot be engaged by the forward face of the pusher plate when the pusher plate is in its normal vertical position. The operator therefore swings the pusher plate about its axis 22 to the dotted line position shown in Fig. 7 whereby the other face of the pusher plate will lie to the rear of the substance. Upon release of the latch 56, the spring 29 feeds the slidable bearing 24 and the pusher plate 10 toward the cutting plane of the knife. When sufficient slices have been cut from the substance to permit the forward side 13 of the pusher plate to be used, the feeding may be stopped and the pusher plate retracted and swung to its normal operative position which is 180° from the dotted line position shown in Fig. 7. The pusher plate is then free to feed the substance until practically the entire substance has been sliced.

In the event that the pusher plate occupies an angular position as indicated by full lines in Fig. 7, the cam member 47 will prevent any part of the pusher plate from being moved into or past the cutting plane of the knife and, therefore, the pusher plate will not strike the knife during reciprocation of the carriage. If the pusher plate is in the horizontal position which it is permitted to occupy, the pin 51 will strike the end 61 of the member and consequently no portion of the pusher plate will enter or pass the cutting plane of the knife.

The particular slicing machine shown in Figs. 8 to 16 inclusive, comprises a base 101 which includes a motor housing 102 containing a motor, not shown, for driving a rotary knife 103. A carriage 104 is arranged above the base 101 and supported by guide rods 105 and 106, the carriage 104 having horizontal reciprocation fore-and-aft across the base in a plane parallel to the cutting plane of the knife. The carriage 104 includes a top plate or food supporting surface 107 which, in the particular instance, is flat and has transverse ribs 108. An apron 109 is arranged at the forward end of the food supporting plate 107 and constitutes an abutment against which the substance bears during operation of the machine. Underneath the substance support 107 and above the bottom plate 110 of the carriage there is arranged a transverse bar or rod 111 upon which there is mounted for slidable movement a bearing 112. A coiled spring 113, Fig. 17, has one of its ends fixed to a part of the carriage frame as indicated at 114 and its other end fixed to a part of the bearing 112 as indicated at 115. The coiled spring 113 passes around a pulley 116 which is pivoted to the underframe 110 as indicated at 117. A second coiled spring 118 has one of its ends fixed to a part of the carriage frame as indicated at 119 and its other end fixed to a part of the bearing 112 as indicated at 120. The coiled spring 118 passes around a pulley 121 which is pivoted to the underframe 110 as indicated at 122. These coiled springs urge the bearing 120 toward the cutting plane of the knife in the direction of the arrow shown in Fig. 17. An extension 123 is rigidly connected to the bearing 112 and extends through a slot 124 formed in the front (toward the operator's stance) of the carriage 104. An upstanding arm or lever 125 is rigidly connected to the projection 123, Figs. 16 to 18, and this lever includes, at its lower end, spaced legs 126 between which there is mounted an operating lever or arm 127. The lever or arm 127 is rigidly mounted on a pin 128 which is pivotally mounted in the spaced legs or ears 126. Means, Fig. 18, comprising a plunger 129 arranged in a recess 130 provided in the lever 127 and urged outwardly by a spring 131, is provided to urge the lever 127 away from the lever 125. A latch 132 is rigidly connected to the pin 128 and is adapted for locking engagement with a pin or stud 133 formed on the front of the carriage 104, Fig. 18. The latch 132 has an inclined surface 134, the outer end 135 of which is always located above the center of the pin 133 whereby the latch will be always guided over the pin until its keeper portion 136 is in such a position so as to receive the pin 133 as shown in Fig. 15. The handles 125 and 127 are for the purpose of locking the bearing 112 at its extreme right-hand position against the tension of the spring. When it is desired to move the bearing 112 from a point adjacent the cutting plane of the machine to a point removed therefrom, at the extreme right-hand position of the carriage, the handle or arm 125 is manually moved toward the right until the latch slides over the pin 133 and then drops downwardly causing the keeper portion 136 to engage the pin 133, Fig. 15.

The slide bearing 112 also includes a forward rigid extension 137 which extends through a slot 138 formed in the forward edge of the carriage. The extension 137, Fig. 10, is provided with a slot or recess in which there is revolubly mounted a roller 139 assisting in supporting the bearing and preventing rocking movement thereof in a vertical direction. The roller 139 extending into the slot 138 and adapted for engagement with the material surrounding the slot is clearly shown in Fig. 10. A bracket 140 is rigidly connected to the extreme end of the projection 137 by means of screws 141, Figs. 10 and 11. This bracket 140 includes spaced outwardly flaring ears 142 between which there is mounted a fitting 143. A rod or pivot pin 144 passes through the ears 142 and through the body of the fitting 143. The upper end of the fitting 143 is provided with an enlarged bored portion 145 forming a pivotal bearing for a pin 146 rigidly formed on a food or substance pusher 147. The food or substance pusher 147 comprises a bar 148 which extends substantially across the full length of the food table 107 and an annular portion 149 to which the pin 146 is rigidly connected. The pivot pin 146 is arranged in a direction parallel to the cutting plane of the knife and inasmuch as the food pusher 147 is pivotally mounted in the bearing 146, the food pusher 147 is adapted to be rotatably supported in the bearing 145. Therefore, the food pusher, when swung about its pivot 146 to the position shown in Figs. 9 and 15, is applicable to push short slices of substance toward the cutting plane. When the food pusher is swung about its pivot 146 from the position shown in Figs. 9 and 12 about an arc of substantially 180°, the substance engaging face will be the rear face 150 and the parts will be in the position as shown in Fig. 13. The fitting 143 is also provided with extensions 151 having stop faces 152 against which a pin 153 on the arm 149 of the pusher is adapted to bear against when the pusher is in the position closer to the cutting plane for accommodating short slices of substance, or swung 180° to accommodate longer pieces of substance. Also, the upper and lower edges 154 and 155 respectively of the pusher 147 may be used to engage the substance as clearly shown in Fig. 12. Substance engaging prongs or teeth 156 may be formed on both of the flat faces of the substance engaging pusher as well as along the top and bottom edges 154 and 155. The substance or feed pusher 147 is maintained in its bearing 145 by a cap or nut 157 which engages the bearing 146 on the pusher and is locked thereto by means of a set screw 158. A friction washer 159, Fig. 10, may be mounted between the cap or nut 157 and the face of the bearing 145 to create sufficient friction to hold the food pusher in any one of its angular positions within the 180° arc perpendicular to the cutting plane of the knife. Due to the pivotal connection of the fitting 143 with the bracket 140, the substance pusher also is movable in an arc parallel to the cutting plane of the machine. The pin 144 is perpendicular to the cutting plane and inasmuch as the fitting 143 is pivotally mounted on the pin 144, the food pusher is pivotally supported and is free to be moved in an arc parallel to the cutting plane of the machine. Friction means are provided for holding the food pusher in various predetermined angular positions about the pin 144. A spring-pressed plunger 160 arranged in a boss 161 formed on the bracket 140 is adapted to engage one of a plurality of notches 162 formed in an extension 163 integral with the fitting 143. An upstanding support 164, Fig. 10, is integral with the bracket 140 and limits the movement of the fitting 143 about its pivot 144 through the medium of an adjustable stop screw 165. Movement of the fitting 143 in an opposite direction is limited by the engagement of the portion 166 of the extension 163 engaging the surface 167 of the upstanding portion 164. Movement of the food pusher about its pin or axis 144 is frictionally resisted by the plunger 160 engaging one of the recesses 162 and the movable limit is positively restricted by the stops 165 and 167.

Means for preventing the pusher from traveling into the cutting plane of the knife comprises a bracket 168 having a pin 169. Some part of the pusher strikes either a part of the bracket or the outstanding pin and therefore it is impossible for any part of the food pusher to come into engagement with the knife even though the carriage is reciprocated and regardless of the position of the food pusher. Additional means for limiting the spring urged movement of the pusher plate comprises an extension finger 170 which is adapted to engage a ham support 171, which ham support may be of the type as shown and disclosed in Figs. 23 to 25 of applicant's copending application Serial No. 718,581, filed April 2, 1934.

An upstanding rod or finger 172 may be fastened to the free end of the food pusher to provide an additional handle for pulling the food pusher against the action of the spring as well as a substance engager when the food pusher is reversed 180° about its axis 146.

The slicing machine shown in Figs. 10 to 18 is of a type which is ordinarily referred to as semi-electric, having a manually reciprocal carriage and a motor driven knife. In this type of slicing machine the food pusher is urged toward the cutting plane of the knife by a spring. In order to gauge the thickness of the material to be sliced and to insure proper slicing, a gauge plate 173 must be employed. The particular construction of the gauge plate forms no part of the present invention, but the gauge plate is adapted to have the substance bear thereagainst after every complete reciprocation of the carriage and the distance the face of the gauge plate is set from the cutting plate of the knife determines the thickness of the slice to be cut. A knob 174 is operatively connected to the gauge plate 173 to move the gauge plate the proper desired distance.

A handle 175 is fixed to the carriage to be grasped by the operator for manually reciprocating the carriage. A knife guard and knife guard plate 176 may be provided for the usual purpose.

The invention provides a pusher plate which is adapted to assume a plurality of angular positions about an axis which is parallel to the cutting plane of the knife. The pusher plate is adapted to be resiliently urged toward the cutting plane of the knife and the particular spring construction herein shown provides positive feeding movement of the pusher plate. The prongs provided on the pusher plate permit both sides and the upper and lower edges of the device to be engaged with the substance, as desired. The pusher plate is prevented from coming in contact with or fouling the knife regardless of its position, and the latching arrangement is a simple and inexpensive way of holding the pusher plate in inoperaitve position and preventing the urging action of the spring from becoming effective so that the substance can be easily and readily positioned on the food table. The food pusher may also have revoluble movement about an axis parallel to the cutting plane of the knife as well as about an axis perpendicular to the cutting plane of the knife. The operation, therefore, of the food or substance pusher may be termed universal. The particular means connected to the food pusher bearing permits convenient means for moving the food pusher along its course and for locking the food pusher at the extreme right-hand side against the urging action of the spring. The food pusher can therefore be maintained in any desirable position, and can be moved out of the way when desired for various purposes. The food pusher also permits a relatively small slicing machine to accommodate substances of various lengths, sizes and thicknesses.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In a slicing machine having a gauge plate and a rotary knife, a pusher plate adapted to push substance toward the gauge plate and toward the cutting plane of the knife, the opposing edges and opposing surfaces of the pusher plate being provided with substance engaging prongs, spring means for giving limited movement to the pusher plate toward the gauge plate and cutting plane, said pusher plate being rotatably mounted on axes both parallel and perpendicular to the cutting plane of the knife whereby the opposing edges and the opposing surfaces of the pusher plate are capable of engagement with the side and end of the substance to accommodate both short and long, thin and thick substances.

2. In a slicing machine having a rotary knife, a reciprocal carriage, and a substance table on the carriage, the combination with a substance pusher plate movable above said table, a member slidably mounted on the carriage beneath the substance table, said slidable member having an arm extending outwardly beyond one edge of the substance table, a bracket carried by said arm, a second bracket pivotally mounted on the first bracket on an axis perpendicular to the cutting plane of the knife and means pivotally mounting the pusher plate on said second bracket on an axis parallel to the cutting plane of the knife whereby the pusher plate is rotatable through an arc of 180° in a plane perpendicular to the cutting plane and in a plane parallel to the cutting plane to accommodate short or long, thick or thin substances to be sliced.

3. In a slicing machine having a gauge plate and a rotary knife, a pusher plate adapted to push the substance toward the gauge plate and toward the cutting plane of the knife, the opposing edges and opposing surfaces of the pusher plate being provided with substance engaging prongs, spring means for imparting limited movement to the pusher plate toward the gauge plate and cutting plane, said pusher plate being rotatably mounted on axes both parallel and perpendicular to the cutting plane of the knife whereby the opposing edges and the opposing surfaces of the pusher plate are capable of engagement with the side and end of the substance to accommodate both short and long, thin and thick substances and means for limiting the movement of said plate about said axes.

4. In a slicing machine having a rotary knife, a reciprocable carriage, a substance table on the carriage, the combination with a substance pusher plate movable above said table, a member slidably mounted on the carriage beneath the substance table, said slidable member having an arm extending outwardly beyond one edge of the substance table, a bracket carried by said arm, a second bracket pivotally mounted on the first bracket for adjustment about an axis perpendicular to the cutting plane of the knife, means pivotally mounting the pusher plate on said second bracket for adjustment about an axis parallel to the cutting plane of the knife whereby the pusher plate is rotatable through an arc of 180 degrees in a plane perpendicular to the cutting plane and in a plane parallel to the cutting plane to accommodate short or long, thick or thin substances to be sliced, and resiliently urged means for maintaining said pusher plate in various positions of adjustment about the perpendicular axis.

5. In a slicing machine having a rotary knife, a reciprocable carriage, a substance table on the carriage, the combination with a substance pusher plate movable above said table, a member slidably mounted on the carriage beneath the substance table, said slidable member having an arm extending outwardly beyond one edge of the substance table, a bracket carried by said arm, a second bracket pivotally mounted on the first bracket for adjustment about an axis perpendicular to the cutting plane of the knife, means pivotally mounting the pusher plate on said second bracket for adjustment about an axis parallel to the cutting plane of the knife whereby the pusher plate is rotatable through an arc of 180 degrees in a plane perpendicular to the cutting plane and in a plane parallel to the cutting plane to accommodate short or long, thick or thin substances to be sliced, and means for frictionally retaining said pusher plate in various positions of adjustment about the parallel axis.

6. In a slicing machine having a rotary knife, a reciprocable carriage, a substance table on the carriage, the combination with a substance pusher plate movable above said table, a member slidably mounted on the carriage beneath the substance table, said slidable member having an arm extending outwardly beyond one edge of the substance table, a bracket carried by said arm, a second bracket pivotally mounted on the first bracket for adjustment about an axis perpendicular to the cutting plane of the knife, means pivotally mounting the pusher plate on said second bracket for adjustment about an axis parallel to the cutting plane of the knife whereby the pusher plate is rotatable through an arc of 180 degrees in a plane perpendicular to the cutting plane and in a plane parallel to the cutting plane to accommodate short or long, thick or thin substances to be sliced, resiliently urged means for maintaining said pusher plate in various positions of adjustment about the perpendicular axis, and means for frictionally retaining said pusher plate in various positions of adjustment about the parallel axis.

7. In a slicing machine having a rotary knife, a reciprocable carriage, and a substance table on the carriage, the combination with a substance pusher plate movable above said table, a member slidably mounted upon said carriage beneath the substance table, said slidable member having an arm extending outwardly beyond one edge of the substance table, a bracket carried by said arm, a second bracket pivotally mounted upon the first bracket on an axis perpendicular to the cutting plane of the knife, means pivotally mounting said pusher plate on said second bracket on an axis parallel to the cutting plane of the knife whereby the pusher plate is rotatable through an arc of 180 degrees in a plane perpendicular to the cutting plane and in a plane parallel to the cutting plane to accommodate short or long, thick or thin substances to be sliced, spring means mounted on the carriage beneath the substance table, said spring means being connected to said carriage and to said slidable member for normally urging said pusher plate forwardly toward the cutting plane of the knife, and releasable means for maintaining said pusher plate in its rearward position against the action of said spring means.

8. A slicing machine comprising a slicing knife, a support, and a substance feeder movable longitudinally toward and from the cutting plane of the slicing knife and relative to the support, a spring operatively connected at its opposite end portions to the substance feeder and frictionless guide means on said support and about which the spring passes intermediately of its end portions to feed substance toward the knife.

9. A slicing machine having a slicing knife, a reciprocal carriage and a food table on the carriage, the combination with a substance pusher above the carriage, a bearing slidably mounted on the carriage beneath the food table and connected to the substance pusher, pulleys carried by the carriage, and a spring passing about said pulleys, said spring having its opposite ends connected to the bearing for urging the slide bearing in a predetermined direction whereby a movement of the carriage away from the knife extends the spring a distance greater than the distance of movement of the carriage while permitting uniform expansion and contraction of said spring.

10. In a slicing machine, the combination with a substance pusher, of a knife, a carriage, a bearing member slidable along said carriage toward the cutting plane of said knife and operatively connected to said substance pusher, a spring secured to said bearing member, and a plurality of guide elements, said spring being bent upon itself a plurality of times and extending back and forth toward and from the cutting plane of said knife and freely guided over said guide elements for changing the direction in which said spring extends while permitting uniform expansion and contraction of said spring.

11. A slicing machine comprising a slicing knife, a carriage, a pusher plate above the carriage, a slide bearing slidable on the underside of said carriage and connected to said plate above the carriage, an elongated coil spring connected at its opposite end portions to the bearing, frictionless guide means intermediate the end portions of the spring and in advance of the slide bearing whereby the spring urges the bearing in a direction toward the slicing knife.

12. In a slicing machine, the combination with a slicing knife, of a substance support, means for moving said knife and support relative to each other, a bearing member on said substance support slidably mounted for movement to and from the cutting plane of said knife, a substance advancing means carried by said bearing member, a gauge plate for limiting the advance of the substance toward the cutting plane of the knife and for gauging the thickness of the slices to be formed, and means for advancing said bearing member toward the cutting plane of said knife, said means comprising frictionless guide means and a spring having a portion thereof connected to said bearing member and a contiguous portion extending toward the cutting plane of said knife, then into guiding engagement with said guide means and back to a point of resistance moving with the bearing member.

13. A slicing machine comprising a substance support, a slicing knife, a bearing member slidably guided along said support, a substance pusher movable toward and from the slicing knife and operatively connected to said bearing member, a plurality of pulleys on said support free of the substance supporting surface thereof, a spring trained over said pulleys back and forth in the general direction of reciprocation of said bearing member, and having its opposite end portions thereof secured to said bearing member, the spring being under tension in all positions of said bearing member to advance the bearing member toward the cutting plane of said knife.

14. In a slicing machine, a reciprocal carriage, a slicing knife, a bearing member slidably mounted on and beneath the carriage, a pusher plate connected to the slide bearing, said pusher plate being pivotally mounted on a pivot parallel to the cutting plane of the knife and movable substantially 180° about its pivot whereby short and long substances can be engaged by opposite faces of the pusher, an elongated coil spring operatively connected at both end portions to the slide bearing, and a pulley carried by the carriage and about which the spring passes, said pulley being arranged intermediate the end portions of the spring.

JOSEPH FOLK.